US006142372A

United States Patent [19]

Wright

[11] Patent Number: 6,142,372

[45] Date of Patent: Nov. 7, 2000

[54] TRACTOR/TRAILER HAVING BAR CODE THEREON AND A GPS RECEIVER FOR TRACKING AND LOGGING PURPOSES

[76] Inventor: John E. Wright, 5179 W. 136th St., Hawthorne, Calif. 90250

[21] Appl. No.: 09/154,857

[22] Filed: Sep. 17, 1998

[51] Int. Cl.[7] ...................................................... G06K 5/00

[52] U.S. Cl. ......................... 235/382; 235/375; 235/384; 235/470; 235/493; 902/4; 340/825.39

[58] Field of Search .................................... 235/382, 380, 235/375, 384, 449, 470, 493; 902/4, 5; 340/539, 988, 825.39, 825.49

[56] References Cited

U.S. PATENT DOCUMENTS

| | | | |
|---|---|---|---|
| 4,555,618 | 11/1985 | Riskin | 235/384 |
| 4,908,500 | 3/1990 | Baumberger | 235/384 |
| 5,014,206 | 5/1991 | Scribner et al. | 364/449 |
| 5,270,936 | 12/1993 | Fukushima et al. | 364/444 |
| 5,422,473 | 6/1995 | Kamata | 235/384 |
| 5,574,465 | 11/1996 | Okada | 342/352 |
| 5,587,575 | 12/1996 | Leitner et al. | 235/384 |
| 5,828,322 | 10/1998 | Eberhard | 235/384 X |
| 5,872,557 | 2/1999 | Weimer et al. | 345/156 |
| 5,892,441 | 4/1999 | Woolley et al. | 235/384 X |
| 6,009,355 | 12/1999 | Obradovich et al. | 701/1 |

FOREIGN PATENT DOCUMENTS

| | | |
|---|---|---|
| 63-182791 | 7/1988 | Japan . |
| 5338735 | 12/1993 | Japan . |
| 2206716 | 1/1989 | United Kingdom . |
| 91-20067 | 12/1991 | WIPO . |

*Primary Examiner*—Michael G Lee

[57] ABSTRACT

A tractor and trailer tracking system is provided including a plurality of tractor/trailers at least one of which has a bar code positioned thereon. Also included is at least one checkpoint post having a code scanner for reading the code upon the same passing therethrough whereby the code is ascertained. Next provided is a central monitoring unit connected to the bar code reader of the checkpoint post and including a time circuit for tracking a current time and date. The central monitoring unit also has a database of vehicle information relating to each of the tractor/trailers and the codes. In use, the central monitoring unit serves to store in another database an entry upon each passing of one of tractor/trailers through one of the checkpoint posts. Each entry includes a time of the passing of the checkpoint post and the vehicle information relating to the tractor/trailer that has passed the checkpoint post.

7 Claims, 2 Drawing Sheets

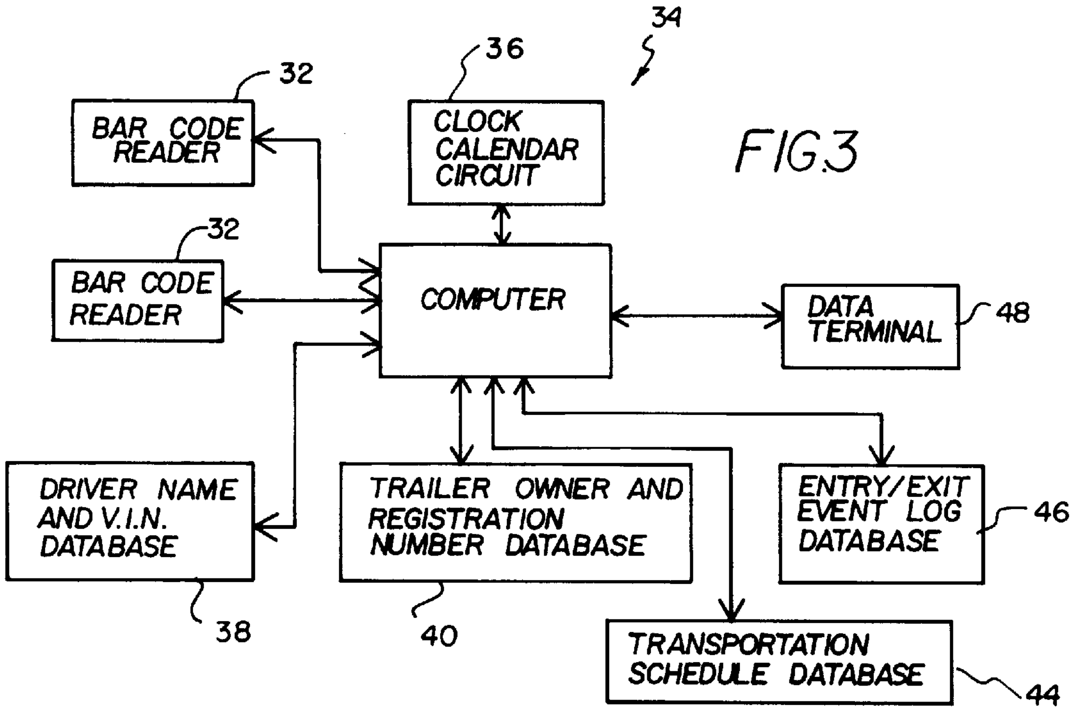
FIG.3
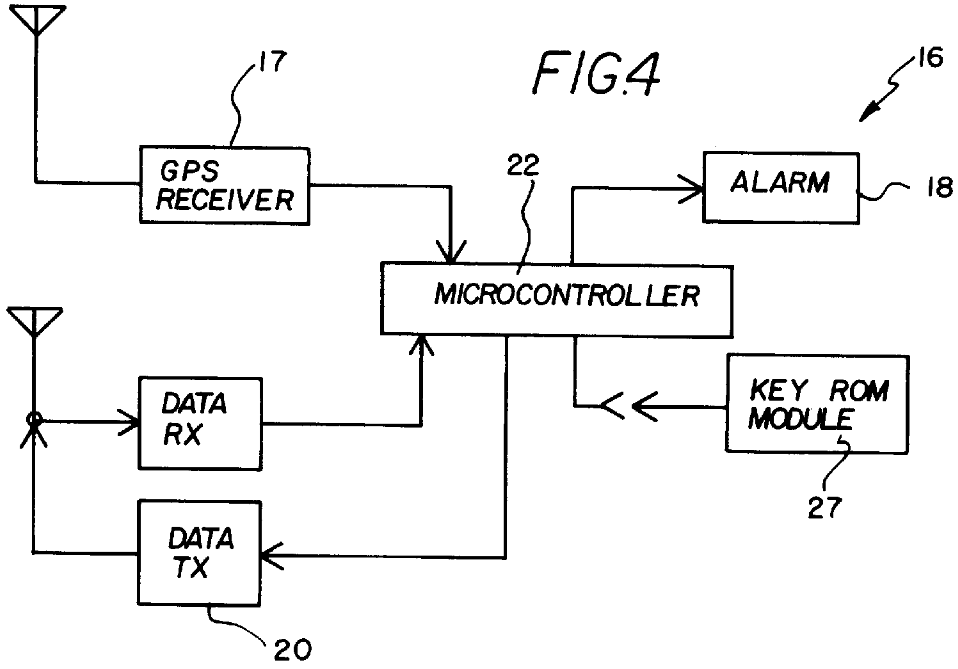
FIG.4
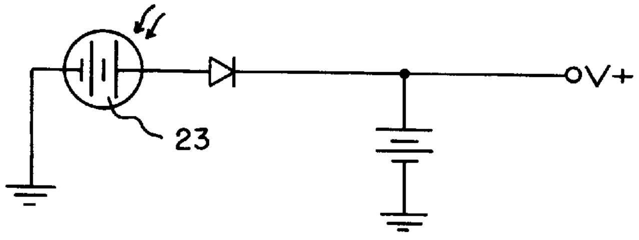

TRACTOR/TRAILER HAVING BAR CODE THEREON AND A GPS RECEIVER FOR TRACKING AND LOGGING PURPOSES

BACKGROUND OF THE INVENTION

1. Field of the Invention

The present invention relates to vehicle recovery systems and more particularly pertains to a new tractor/trailer tracking system for tracking various tractors and trailers as they pass through various checkpoints.

2. Description of the Prior Art

The use of vehicle recovery systems is known in the prior art. More specifically, vehicle recovery systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle recovery systems and the like include U.S. Pat. No. 5,082,365; U.S. Pat. No. 5,225,842; U.S. Pat. No. 4,555,618; U.S. Pat. No. 5,218,367; U.S. Pat. No. 3,349,403; and U.S. Pat. No. 2,204,438 which are incorporated herein by reference.

In these respects, the tractor/trailer tracking system according to the present invention substantially departs from the conventional concepts and designs of the prior art, and in so doing provides an apparatus primarily developed for the purpose of tracking various tractors and trailers as they pass through various checkpoints.

SUMMARY OF THE INVENTION

In view of the foregoing disadvantages inherent in the known types of vehicle recovery systems now present in the prior art, the present invention provides a new tractor/trailer tracking system construction wherein the same can be utilized for tracking various tractors and trailers as they pass through various checkpoints.

The general purpose of the present invention, which will be described subsequently in greater detail, is to provide a new tractor/trailer tracking system apparatus and method which has many of the advantages of the vehicle recovery systems mentioned heretofore and many novel features that result in a new tractor/trailer tracking system which is not anticipated, rendered obvious, suggested, or even implied by any of the prior art vehicle recovery systems, either alone or in any combination thereof.

To attain this, the present invention generally comprises a plurality of trailers each having a horizontally oriented bar code positioned on a side face thereof. As shown in FIG. 1, the bar code includes a plurality of spaced vertically oriented lines representing a trailer code. The trailers each includes a global positioning satellite unit adapted to generate current coordinates of the trailer. As shown in FIG. 4, each trailer further includes an alarm for generating an audible signal upon actuation. Also provided is a transmitter for transmitting an alarm signal containing the current coordinates of the trailer via free space upon the actuation thereof. Connected between the global positioning satellite unit, alarm, and transmitter is a microcontroller for actuating the alarm and the transmitter. This is carried out only upon the lack of receipt of an authentication code in combination with the trailer being moved. Associated with the trailers is a plurality of tractors each having a horizontally oriented bar code positioned on a side face thereof. Similar to the trailers, the tractors include a plurality of spaced vertically oriented lines representing a tractor code. Each tractor further includes a card reader mounted within a cab of the tractor, as shown in FIG. 2. Such card reader is releasably connected to one of the trailers for transmitting the authentication code to the microcontroller of the trailer only upon a proper card being swiped through the card reader. FIG. 1 shows one of a plurality of checkpoint posts. Each of such checkpoint posts includes an associated check point identification code. A gate of each checkpoint post is equipped with an opening having a pair of bar code scanners for reading the bar codes of one of the tractors and the trailers upon the same passing therethrough. Once the tractor and trailer passes the gate, the tractor code and the trailer code are ascertained. FIG. 3 shows a central monitoring unit connected to the bar code readers of each of the checkpoint posts. The central monitoring unit includes a clock/calendar circuit for tracking a current time and date. Also included is a first database having a plurality of tractor vehicle numbers, tractor driver names, and tractor codes stored therein. Associated therewith is a second database including a plurality of trailer registration numbers, trailer owner names and trailer codes stored therein. FIG. 3 also shows a third database including a transportation schedule database having a schedule of tractor and trailer passes at each checkpoint post. In use, the central monitoring unit is adapted to store in a fourth database an entry upon each passing of one of the tractors and trailers through one of the checkpoint posts. Each entry includes a time and a date of the passing of the checkpoint post and the check point identification code of the checkpoint post that is passed. The entry further includes the tractor vehicle number, tractor driver name, trailer registration number, and trailer owner which may be looked up in the first and second databases using the tractor and trailer codes. The central monitoring unit further serves to provide an alarm upon one of the tractors and trailers passing through one of the checkpoint posts at a time that is not indicated on the transportation schedule database. Finally, the central monitoring unit further includes a display and a receiver for receiving the alarm signal and depicting on the display the current coordinates of the trailer. Note FIG. 2.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tractor/trailer tracking system apparatus and method which has many of the advantages of the vehicle recovery systems mentioned heretofore and many novel features that result in a new tractor/trailer tracking system which is not anticipated, rendered obvious, suggested, or even implied by any of the prior art vehicle recovery systems, either alone or in any combination thereof.

It is another object of the present invention to provide a new tractor/trailer tracking system which may be easily and efficiently manufactured and marketed.

It is a further object of the present invention to provide a new tractor/trailer tracking system which is of a durable and reliable construction.

An even further object of the present invention is to provide a new tractor/trailer tracking system which is susceptible of a low cost of manufacture with regard to both materials and labor, and which accordingly is then susceptible of low prices of sale to the consuming public, thereby making such tractor/trailer tracking system economically available to the buying public.

Still yet another object of the present invention is to provide a new tractor/trailer tracking system which provides in the apparatuses and methods of the prior art some of the advantages thereof, while simultaneously overcoming some of the disadvantages normally associated therewith.

Still another object of the present invention is to provide a new tractor/trailer tracking system for tracking various tractors and trailers as they pass through various checkpoints.

Even still another object of the present invention is to provide a new tractor/trailer tracking system that includes a plurality of tractor/trailers at least one of which has a bar code positioned thereon. Also included is at least one checkpoint post having a code scanner for reading the code upon the same passing therethrough whereby the code is ascertained. Next provided is a central monitoring unit connected to the bar code reader of the checkpoint post and including a time circuit for tracking a current time. The central monitoring unit also has a database of vehicle information relating to each of the tractor/trailers and the codes. In use, the central monitoring unit serves to store in another database an entry upon each passing of one of tractor/trailers through one of the checkpoint posts. Each entry includes a time of the passing of the checkpoint post and the vehicle information relating to the tractor/trailer that has passed the checkpoint post.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic diagram of the central monitoring unit of the present invention.

FIG. 4 is a schematic diagram of the global positioning satellite system and related components of one of the trailers of the present invention.

DESCRIPTION OF THE PREFERRED EMBODIMENT

Figure 1:
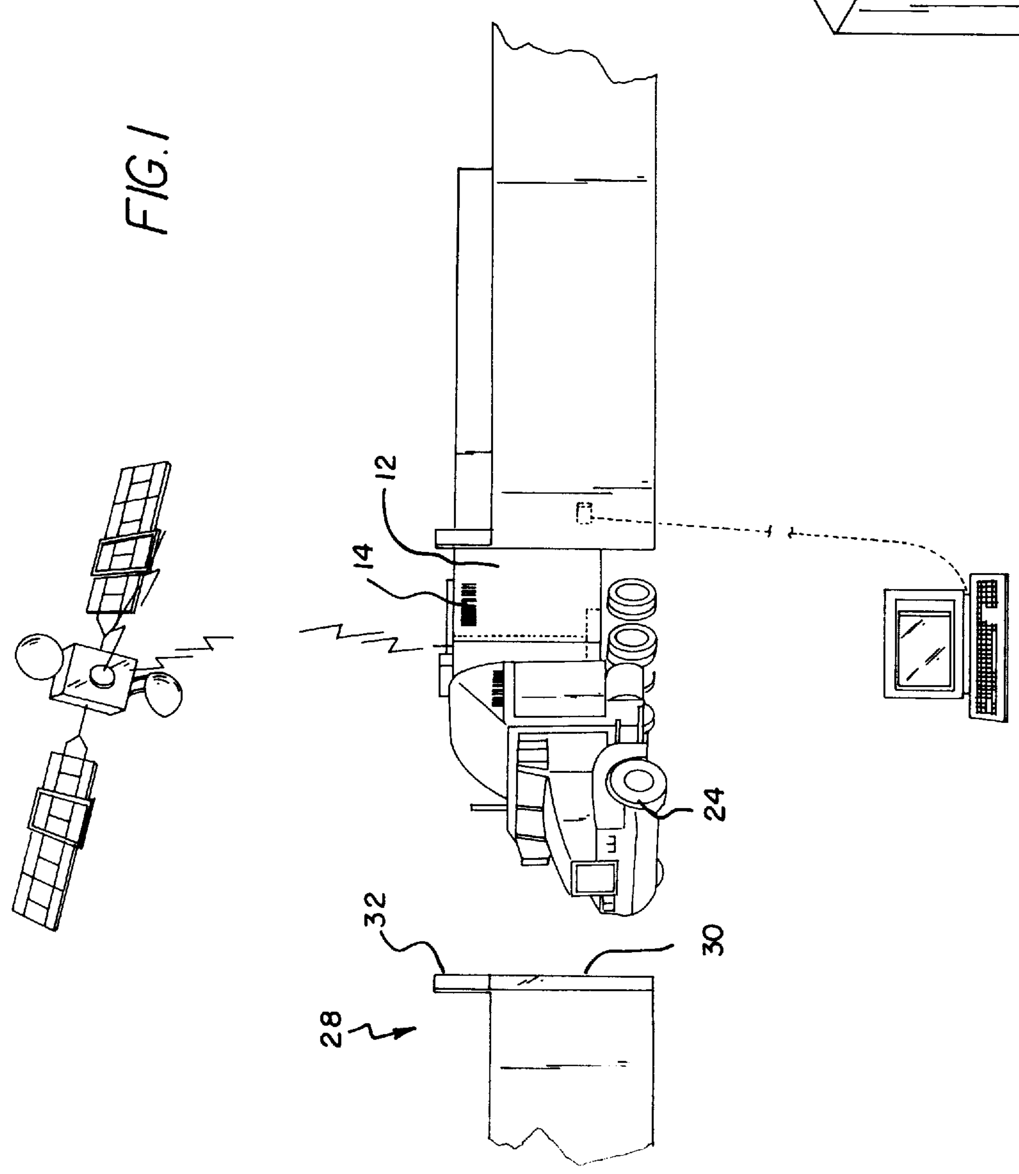
FIG. 1 is a perspective view of one of the checkpoint posts of the present invention.

With reference now to the drawings, and in particular to FIGS. 1 through 4 thereof, a new tractor/trailer tracking system embodying the principles and concepts of the present invention and generally designated by the reference numeral 10 will be described.

The present invention, designated as numeral 10, includes a plurality of trailers 12 each having a horizontally oriented bar code 14 positioned on a side face thereof. As shown in FIG. 1, the bar code includes a plurality of spaced vertically oriented lines representing a trailer code. The trailers each includes a trailer circuit 16 with a global positioning satellite unit 17 adapted to generate current coordinates of the trailer. As shown in FIG. 4, each trailer further includes an alarm 18 for generating an audible signal upon actuation. Also provided is a transmitter 20 for transmitting an alarm signal containing the current coordinates of the trailer via free space upon the actuation thereof. As an option, the transmitter may be actuated by a prompting signal received via free space by a receiver to facilitate recovery of the trailer from afar. Connected between the global positioning satellite unit, alarm, and transmitter is a microcontroller 22 for actuating the alarm and the transmitter. This actuation occurs only upon the lack of receipt of an authentication code in combination with the trailer being moved. A mercury switch or the like may be used to indicate when the trailer has moved. In the preferred embodiment, the various electrical components of the trailer are powered by a solar panel 23 and battery back-up.

Figure 2:
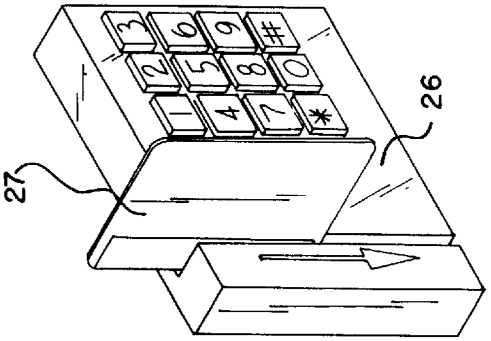
FIG. 2 is an exploded perspective view of the card reader of one of the tractors and the display/receiver of the central monitoring unit of the present invention.

Associated with the trailers is a plurality of tractors 24 each having a horizontally oriented bar code positioned on a side face thereof. Similar to the trailers, the tractors include a plurality of spaced vertically oriented lines representing a tractor code. Each tractor further includes a card reader 26 mounted within a cab of the tractor, as shown in FIG. 2. Such card reader is releasably connected to the microcontroller of one of the trailers via a plug or the like for transmitting the authentication code to the microcontroller of the trailer only upon a proper card 27 being swiped through the card reader. Ideally, such card is a magnetically or through the use of ROM chip equipped with the authentication code prior to the driver attempting to haul the trailer. In addition to the card reader, a key pad may also be included to augment security by requiring a driver PIN prior to the authentication code being transmitted. Preferably, the microcontroller requires the authentication code again after a predetermined amount of time once the trailer microcontroller is disconnected from the card reader of the tractor.

FIG. 1 shows one of a plurality of checkpoint posts 28. Such checkpoint posts may be positioned anywhere but are preferably positioned at warehouses at which materials are both loaded and unloaded. For reasons that will soon become apparent, each of such checkpoint posts includes an associated check point identification code. A gate of each checkpoint post is equipped with an opening 30 having a pair of bar code scanners 32 flanking the same for reading the bar codes of one of the tractors and the trailers upon the same passing therethrough. Once the tractor and trailer passes the gate, the tractor code and the trailer code are ascertained.

FIG. 3 shows a central monitoring unit 34 connected to the bar code readers of each of the checkpoint posts. The central monitoring unit includes a clock/calendar circuit 36 for tracking a current time and date. Also included is a first database 38 having a plurality of tractor vehicle numbers, tractor driver names, and tractor codes stored therein. Associated therewith is a second database 40 including a plurality of trailer registration numbers, trailer owner names and trailer codes stored therein. FIG. 3 also shows a third database 44 including a transportation schedule database having a schedule of tractor and trailer passes at each checkpoint post.

In use, the central monitoring unit is adapted to store in a fourth database 46 an entry upon each passing of one of the tractors and trailers through any one of the checkpoint posts. Each entry includes a time and a date of the passing of the checkpoint post and the check point identification code of the checkpoint post that is passed. The entry further includes the tractor vehicle number, tractor driver name, trailer registration number, and trailer owner which may be looked up in the first and second databases using the tractor and trailer codes ascertained by the barcodes.

The central monitoring unit further serves to provide an alarm upon one of the tractors and trailers passing through one of the checkpoint posts at a time that is not indicated on the transportation schedule database. Ideally, the schedule includes a range of times in which the tractors and trailers are due to pass. If the tractors and trailers pass the checkpoint post outside of such time range, the alarm is actuated. As shown in FIG. 3, the central monitoring unit further includes a data terminal 48 for making the information of the fourth database to third parties. Finally, the central monitoring unit includes a unit having a display 52 and a receiver 54 for receiving the alarm signals from the trailers and depicting on the display the current coordinates of the transmitting trailer. Note FIG. 2. Such unit may further be equipped with a transmitter for transmitting a signal which prompts the GPS system of one of the trailers.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tractor and trailer tracking system comprising, in combination:

a plurality of trailers each having a horizontally oriented bar code positioned on a side face thereof including a plurality of spaced vertically oriented lines representing a trailer code, the trailers each including a global positioning satellite unit adapted to generate current coordinates of the trailer, an alarm for generating an audible signal upon actuation, a transmitter for transmitting an alarm signal containing the current coordinates of the trailer via free space upon the actuation thereof, and a microcontroller connected between the global positioning satellite unit, alarm, and transmitter for actuating the alarm and the transmitter only upon the lack of receipt of an authentication code in combination with the trailer being moved;

a plurality of tractors each having a horizontally oriented bar code positioned on a side face thereof including a plurality of spaced vertically oriented lines representing a tractor code, each tractor further including a card reader mounted within a cab of the tractor and releasably connected to one of the trailers for transmitting the authentication code to the microcontroller of the trailer only upon a proper card being swiped through the card reader;

a plurality of checkpoint posts each including an associated check point identification code, a gate with an opening having a pair of bar code scanners for reading the bar codes of one of the tractors and the trailers upon the same passing therethrough whereby the tractor code and the trailer code are ascertained;

a central monitoring unit connected to the bar code readers of each of the checkpoint posts and including a clock/calendar circuit for tracking a current time and date, a first database including a plurality of tractor vehicle numbers, tractor driver names, and tractor codes, a second database including a plurality of trailer registration numbers, trailer owner names and trailer codes, a third database including a transportation schedule database including a schedule of tractor and trailer passes at each checkpoint post, wherein the central monitoring unit is adapted to store in a fourth database an entry upon each passing of one of the tractors and trailers through one of the checkpoint posts with each entry including a time and a date of the passing of the checkpoint post, the check point identification code of the checkpoint post passed and further the tractor vehicle number, tractor driver name, trailer registration number, and trailer owner name as indicated by the tractor and trailer codes, the central monitoring unit further adapted to provide an alarm upon a passing of one of the tractors and trailers through one of the checkpoint posts that is not indicated on the transportation schedule database;

said central monitoring unit further including a display and a receiver for receiving the alarm signal and depicting on the display the current coordinates of the trailer.

2. A tracking system comprising:

a plurality of tractors and trailers at least one of which having a code positioned thereon;

at least one checkpoint post having a code scanner for reading the code upon the same passing therethrough;

a central monitoring unit connected to the code reader of the checkpoint post and including a time circuit for tracking a current time and a database of vehicle information relating to at least one of the tractors and the trailers and the codes, wherein the central monitoring unit is adapted to store in another database an entry upon each passing of one of the tractors and trailers through the checkpoint post with each entry including the time of the passing of the checkpoint post and the vehicle information relating to the at least one of the tractors and the trailers that has passed the checkpoint post;

wherein the trailers each include a global positioning satellite unit adapted to generate current coordinates of the trailer, a transmitter for transmitting an alarm signal containing the current coordinates of the trailer via free space upon the actuation thereof, and a microcontroller connected between the global positioning satellite unit and transmitter for actuating the transmitter only upon the lack of receipt of an authentication code, said central monitoring unit further including a display and a receiver for receiving the alarm signal and depicting on the display the current coordinates of the trailer; and wherein the tractors each include a card reader mounted within a cab of the tractor and releasably connected to the microcontroller of one of the trailers for transmitting the authentication code to the microcontroller of the trailer only upon a proper card being swiped through the card reader.

3. A tractor and trailer tracking system as set forth in claim 2 wherein a plurality of checkpoint posts are included and each checkpoint post has a check point identification code which is stored in the database with the time and vehicle information to identify which checkpoint post has been passed.

4. A tractor and trailer tracking system as set forth in claim 2 wherein the vehicle information includes a tractor vehicle number and a tractor driver name.

5. A tractor and trailer tracking system as set forth in claim 2 wherein the vehicle information includes a trailer registration number and a trailer owner name.

6. A tractor and trailer tracking system as set forth in claim 2 wherein the central monitoring unit includes a schedule database including a schedule of tractor and trailer passes at the checkpoint post, wherein the central monitoring unit is further adapted to provide an alarm upon a passing of one of the tractors and trailers through the checkpoint post that is not indicated on the schedule database.

7. A tractor and trailer tracking system as set forth in claim 2 wherein the tractors each includes a keypad mounted within a cab of the tractor and releasably connected to the microcontroller of one of the trailers for transmitting the authentication code to the microcontroller of the trailer only upon the entry of a correct personal identification number.

* * * * *